US007788453B2

(12) United States Patent
Boyd et al.

(10) Patent No.: US 7,788,453 B2
(45) Date of Patent: *Aug. 31, 2010

(54) REDIRECTION OF STORAGE ACCESS REQUESTS BASED ON DETERMINING WHETHER WRITE CACHING IS ENABLED

(75) Inventors: Kenneth Wayne Boyd, Tucson, AZ (US); Kenneth Fairclough Day, III, Tucson, AZ (US); Charles William Lickel, Tucson, AZ (US); John Jay Wolfgang, Winston-Salem, NC (US)

(73) Assignee: International Business Machines Corporation, Armonk, NY (US)

( * ) Notice: Subject to any disclaimer, the term of this patent is extended or adjusted under 35 U.S.C. 154(b) by 225 days.

This patent is subject to a terminal disclaimer.

(21) Appl. No.: 11/945,098

(22) Filed: Nov. 26, 2007

(65) Prior Publication Data
US 2008/0071999 A1   Mar. 20, 2008

Related U.S. Application Data

(63) Continuation of application No. 11/035,916, filed on Jan. 14, 2005, now Pat. No. 7,366,846.

(51) Int. Cl.
*G06F 12/00* (2006.01)
(52) U.S. Cl. .................. 711/144; 711/162; 711/143; 711/135; 711/133; 714/6
(58) Field of Classification Search .......... 711/144, 711/162, 143, 135, 133; 714/6
See application file for complete search history.

(56) References Cited

U.S. PATENT DOCUMENTS 5,633,999 A   5/1997   Clowes et al.
5,781,716 A   7/1998   Hemphill et al.
5,996,088 A   11/1999  Frank et al.
6,330,600 B1  12/2001  Matchefts et al.
6,353,878 B1  3/2002   Dunham
6,567,893 B1  5/2003   Challenger et al.
6,625,750 B1  9/2003   Duso et al.
6,725,392 B1  4/2004   Frey et al.
6,839,810 B2* 1/2005   Takahashi ................... 711/141
6,986,018 B2  1/2006   O'Rourke et al.
7,185,222 B2  2/2007   Burton et al.
7,334,029 B2* 2/2008   Shiga et al. ................. 709/223
2003/0212869 A1  11/2003  Burkey
2003/0212870 A1  11/2003  Nowakowski
2004/0078397 A1  4/2004   Mehta et al.
2004/0205297 A1  10/2004  Bearden
2005/0256972 A1* 11/2005  Cochran et al. ............. 709/245
2006/0015767 A1  1/2006   Hsu et al.
2006/0047899 A1  3/2006   Ilda et al.

* cited by examiner

*Primary Examiner*—Hong Kim
(74) *Attorney, Agent, or Firm*—Rabindranath Dutta; Konrad Raynes & Victor LLP

(57) ABSTRACT

Provided are a method, system, and article of manufacture, wherein a controller receives a request from one of a plurality of hosts. The controller determines whether a primary storage control unit coupled to the controller is operational. A response is generated by accessing the primary storage control unit, in response to determining that the primary storage control unit is operational. The response is generated by accessing a secondary storage control unit, in response to determining that the primary storage control unit is not operational, wherein data is replicated synchronously from the primary storage control unit to the secondary storage control unit.

14 Claims, 4 Drawing Sheets

REDIRECTION OF STORAGE ACCESS REQUESTS BASED ON DETERMINING WHETHER WRITE CACHING IS ENABLED

CROSS-REFERENCE TO RELATED APPLICATIONS

This application is a continuation of application Ser. No. 11/035,916 filed on Jan. 14, 2005 and now issued as U.S. Pat. No. 7,366,846 issued Apr. 29, 2008, which is incorporated herein by reference in its entirety.

BACKGROUND

1. Field

The disclosure relates to a method, system, and article of manufacture for redirecting storage access requests.

2. Background

A host server may continue to perform data access operations to a backup or secondary storage controller in the event of a failure of a primary storage controller. For example, in IBM* HyperSwap* configurations a host server may access a primary and a secondary storage controller. The host server may direct all storage accesses to the primary storage controller and the two storage controllers may operate in concert to ensure that identical data is saved in both. HyperSwap software on the host server may be able to determine when the primary storage controller has failed and can automatically redirect all storage accesses to the secondary storage controller.

*IBM, ESCON, HyperSwap, TotalStorage, and OS/390 are trademarks or registered trademarks of International Business Machines Corporation.

The primary and secondary storage controllers may use a Peer-to-Peer Remote Copy (PPRC) function to copy data from the primary storage controller to the secondary storage controller. In the synchronous type of operation for PPRC, i.e., synchronous PPRC, the updates done by a host application to the local storage volumes at the primary storage controller are synchronously shadowed onto the remote storage volumes at the secondary storage controller. As synchronous PPRC is a synchronous copying solution, write updates are ensured on both copies (local and remote storage volumes) before the write is considered to be completed for the host application. In synchronous PPRC the host application does not get the "write complete" condition until the update is synchronously done in both the local and the remote volumes. Therefore, from the perspective of the host application on the host server the data at the remote volumes at the secondary storage controller is equivalent to the data at the local volumes at the primary storage controller, and a failed primary storage controller can be substituted by the secondary storage controller.

SUMMARY OF THE DESCRIBED EMBODIMENTS

Provided are a method, system, and article of manufacture, wherein a controller receives a request from one of a plurality of hosts. The controller determines whether a primary storage control unit coupled to the controller is operational. A response is generated by accessing the primary storage control unit, in response to determining that the primary storage control unit is operational. The response is generated by accessing a secondary storage control unit, in response to determining that the primary storage control unit is not operational, wherein data is replicated synchronously from the primary storage control unit to the secondary storage control unit.

In certain embodiments, the controller includes a cache, wherein a determination is made as to whether write caching is enabled in the controller. The secondary storage control unit is updated with contents of the cache, prior to the generating of the response by accessing the secondary storage control unit.

In additional embodiments, the controller includes a cache, wherein write caching is enabled in the controller, wherein the request is a write request, and wherein the data is written to the cache in response to receiving the write request. A response is made to the one of the plurality of hosts from which the write request was received, wherein the response indicates that the write request has been executed, and wherein the data written to the cache is destaged periodically to the primary storage control unit, in response to determining that that primary storage control unit is operational, and to the secondary storage control unit, in response to determining that the primary storage control unit is not operational.

In further embodiments, the plurality of hosts operate without any notification that indicates to the plurality of hosts which storage control unit satisfies requests from the hosts.

In yet further embodiments, the controller includes a cache, wherein write caching is enabled, wherein the request is a read request, and wherein the read request is satisfied from the cache, in response to determining that the read request can be satisfied from the cache. The read request is satisfied from the primary storage control unit if the primary storage control unit is operational, in response to determining that the read request cannot be satisfied from the cache. The secondary storage control unit is updated with contents of the cache if the primary storage control unit is not operational. The read request is satisfied from the secondary storage control unit subsequent to the updating of the secondary storage control unit.

In still further embodiments, the data is synchronously replicated between the primary storage control unit and the secondary storage control unit by sending via the primary storage control unit, a completion notification to the controller after an update to the primary storage control unit has been copied to the secondary storage control unit, wherein the primary storage control unit and the secondary storage control unit include identical data after the data is replicated synchronously.

In additional embodiments, a plurality of operating systems execute on the plurality of hosts, wherein a single application in the controller enables the plurality of hosts to access data stored in the primary storage control unit and the secondary storage control unit, and wherein if the primary storage control unit is operational then the primary storage control unit is available for processing data transfer requests generated by the plurality of hosts.

In still additional embodiments, the controller is a storage area network volume controller that controls storage volumes in the primary and the secondary storage control units, wherein the primary storage control unit is a primary storage controller, wherein the secondary storage control unit is a secondary storage controller, wherein a redirection application on the storage area network volume controller performs the receiving, the determining, the generating of the response by accessing the primary storage controller, and the generating of the response by accessing the secondary storage controller.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
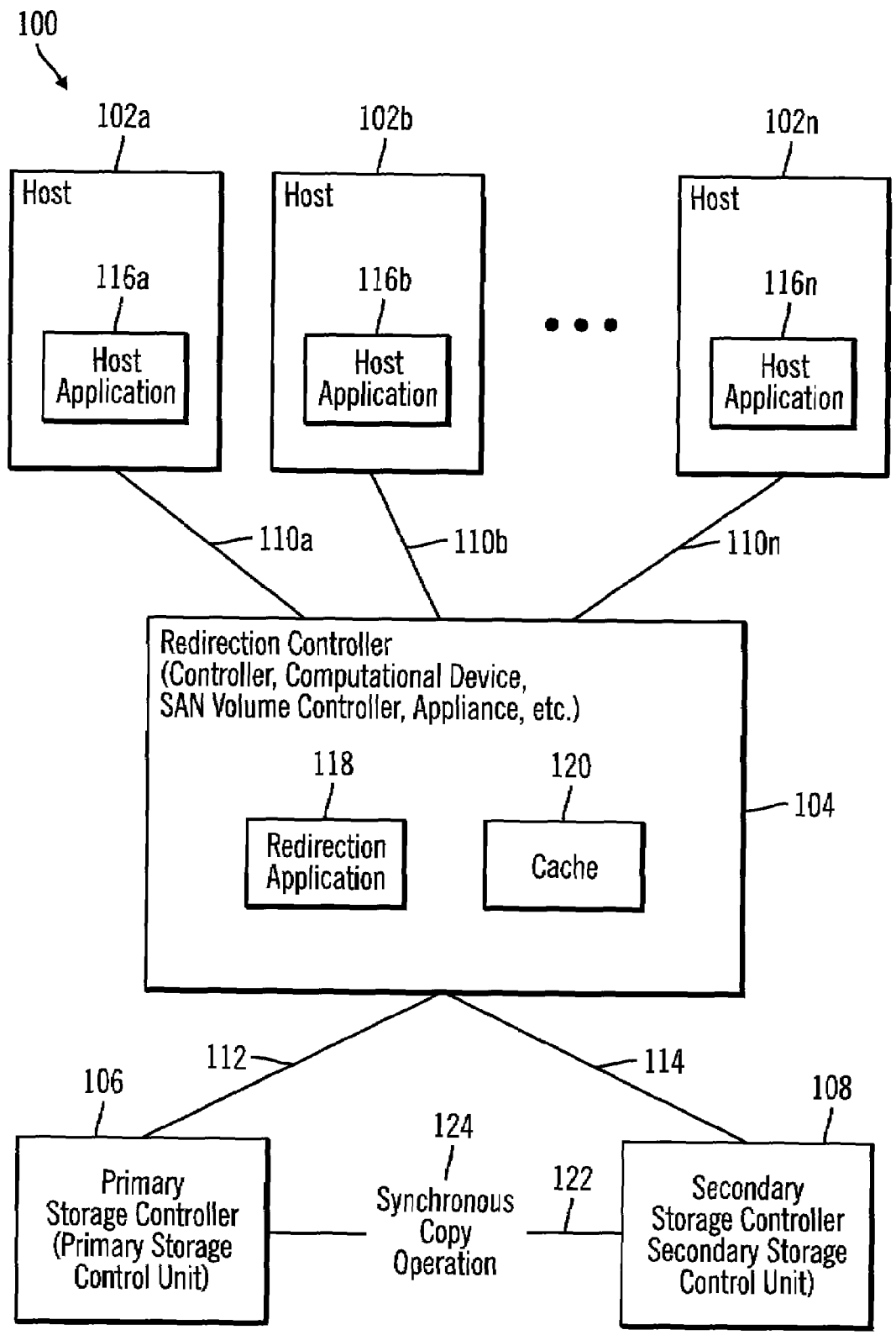
FIG. 1 illustrates a block diagram of a computing environment in accordance with certain embodiments.

FIG. 1 illustrates a computing environment 100 that includes a plurality of hosts 102a, 102b, . . . , 102n, a redirection controller 104, a primary storage controller 106 and a secondary storage controller 108. In certain embodiments the hosts 102a . . . 102n are coupled to the redirection controller 104 via data interface channels 110a, 110b, . . . , 110n, and the redirection controller 104 is coupled to the primary and secondary storage controllers 104, 106 via data interface channels 112, 114. The data interface channels 110a . . . 110n, 112, 114 may include the Enterprise System Connection (ESCON)* channel or any other suitable data interface mechanism, such as, fibre channel, Storage Area Network (SAN) interconnections, etc.

The hosts 102a . . . 102n may comprise any suitable computational device including those presently known in the art, such as, a personal computer, a workstation, a server, a mainframe, a hand held computer, a palm top computer, a telephony device, a blade computer, a network appliance, etc. The hosts 102a . . . 102n may include any suitable operating system (not shown), such as, the IBM OS/390* operating system, the Microsoft* Windows* operating system, etc. The hosts 102a . . . 102n may also include host applications 116a, 116b, . . . , 116n that send Input/Output (I/O) requests to the redirection controller 104.

*Microsoft and Windows are trademarks or registered trademarks of Microsoft Corporation.

The redirection controller 104 may comprise any suitable device including those presently known in the art, such as, a computational device, a controller, an IBM TotalStorage* SAN Volume Controller, an appliance, etc. The redirection controller 104 may include a redirection application 118 and a cache 120. The redirection application 118 may be implemented in software, hardware, firmware or any combination thereof.

The redirection application 118 receives I/O requests from the host applications 116a . . . 116n and may respond to the received I/O requests by accessing the primary storage controller 106. If the event of a failure of the primary storage controller 106, the redirection application 118 may respond to the received I/O requests by accessing the secondary storage controller 108.

The primary and secondary storage controllers 106, 108 may be within a synchronous communication distance of each other. The synchronous communication distance between two storage controllers is the distance up to which synchronous communication is feasible between the two storage controllers. The storage controllers 106, 108, i.e., storage control units, control storage volumes (not shown), where the storage volumes may be configured as a Direct Access Storage Device (DASD), one or more Redundant Array of Independent Disks (RAID), Just a bunch of disks (JBOD), or any other data repository system known in the art.

A data interface channel 122 may couple the primary storage controller 106 to the secondary storage controller 108. Data in the primary storage controller 106 may be copied synchronously (reference numeral 124) to the secondary storage controller 108. As a result of synchronous copying, requests from the redirection application 118 to the primary storage controller 106 are not completed until modifications to data controlled by the primary storage controller 106 are copied to the secondary storage controller 108. In certain embodiments, the synchronous copy operation 124 that synchronously copies data may be a synchronous PPRC operation.

FIG. 1 illustrates certain embodiments in which the redirection application 118 on the redirection controller 104 redirects I/O requests from host applications 116a . . . 116n to an operational primary storage controller 106. If the primary storage controller 106 is not operational, then the redirection application 118 redirects the I/O requests from the host applications 116a . . . 116n to the secondary storage controller 108. In certain embodiments, a plurality of operating systems execute on the plurality of hosts 102a . . . 102n, and a single redirection application 118 in the redirection controller 104 enables the plurality of hosts 102a . . . 102n to access data stored in the primary storage controller 106 and the secondary storage controller 108.

Figure 2:
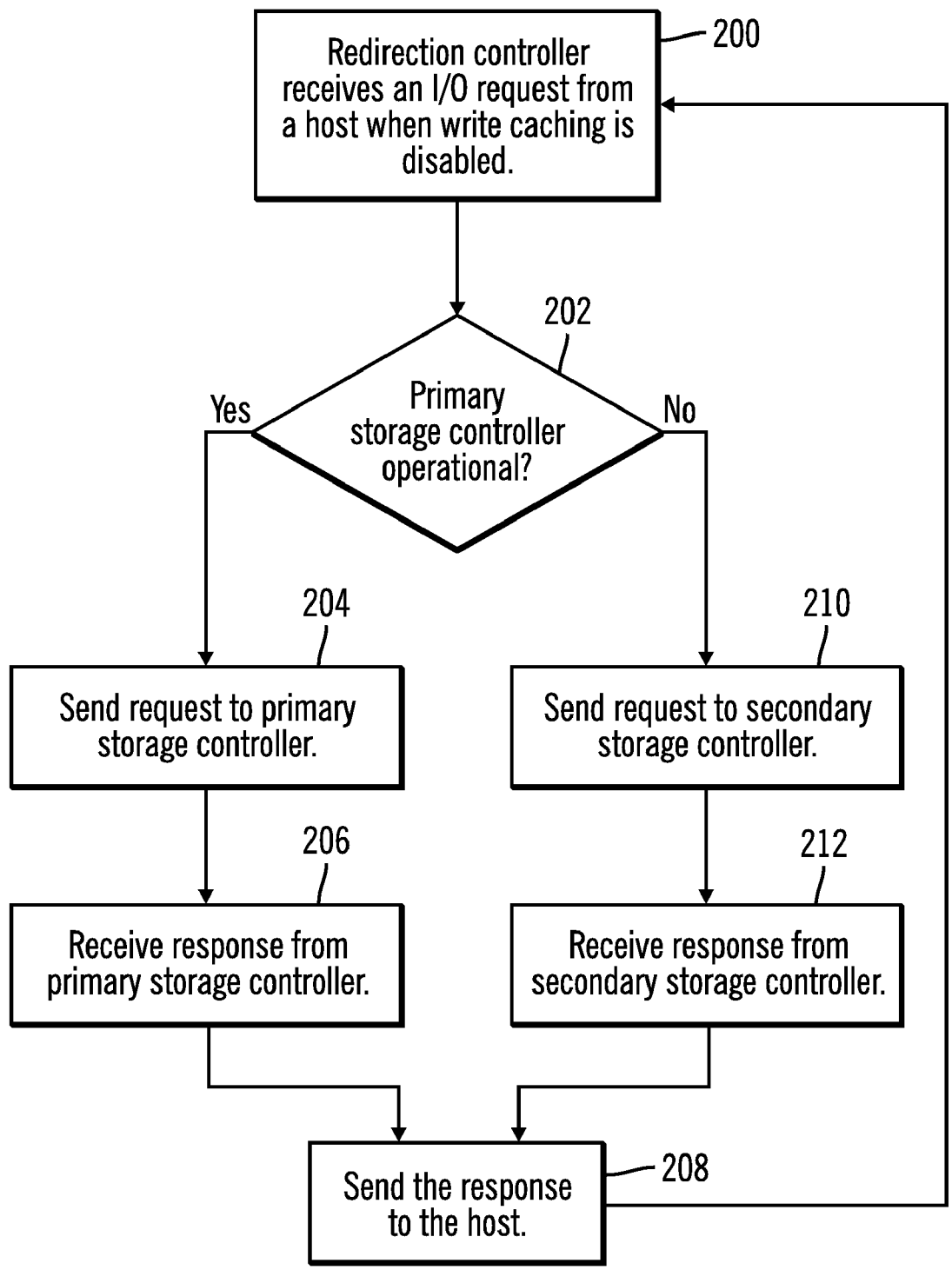
FIG. 2 illustrates operations for redirecting storage accesses when write caching is disabled in a redirection controller, in accordance with certain embodiments.

FIG. 2 illustrates operations for redirecting storage accesses when write caching is disabled in the redirection controller 104, in accordance with certain embodiments. In certain embodiments, the operations may be implemented in the redirection application 118.

In certain embodiments, write caching is disabled in the redirection controller 104. The disablement of write caching may be performed by the redirection application 118 or by another application. When write caching is disabled, the redirection application 118 executes write operations received from the host applications 116a . . . 116n by writing to the operational primary storage controller 106. If the primary storage controller 106 is not operational then the redirection application 118 executes the write operations by writing to the secondary storage controller 108. When write caching is disabled, the cache 120 is not used to execute the write operations.

Control starts at block 200, where the redirection application 118 receives an I/O request from one of the host applications 116a, . . . 116n when write caching is determined to be disabled. The redirection application 118 determines (at block 202) whether the primary storage controller 106 is operational, i.e., the primary storage controller 106 has not failed.

If the redirection application 118 determines (at block 202) that the primary storage controller 106 is operational then the redirection application 118 sends (at block 204) the I/O request to the primary storage controller 106 for execution. For example, a write request may write data to the storage volumes controlled by the primary storage controller 106, and a read request may read data from the storage volumes controlled by the primary storage controller 106.

The redirection application 118 receives (at block 206) a response from the primary storage controller 106, where the response is a result of the execution of the sent request. For example, the response may provide the data requested by a read request. Since the primary storage controller 106 is in a synchronous PPRC relationship with the secondary storage controller 108 the response is received by the redirection application 118 only after the data in the primary and secondary storage controllers 106, 110 are identical.

The redirection application 118 sends (at block 208) the response to the host application from which the redirection application 118 received the I/O request. Control returns to block 200, where the redirection application 118 receives another I/O request from one of the hosts applications 116a . . . 116n. In certain embodiments, the I/O requests from the host applications 116a . . . 116n may already have been buffered in the redirection controller 104 for processing and control proceeds to block 202.

If the redirection application 118 determines (at block 202) that the primary storage controller 106 is not operational then the redirection application 118 sends (at block 210) the I/O request to the secondary storage controller 108 for execution. The secondary storage controller 108 processes the I/O request and the redirection application 118 receives (at block 212) a response from the secondary storage controller 108. Since the secondary storage controller 108 has the same data as the primary storage controller 106 at the point of failure of the primary storage controller, the response from the secondary storage controller 108 is correct. The redirection application 118 sends (at block 208) the received response to the host application from which the redirection application 118 received the I/O request, and control returns to block 200 for processing additional I/O requests from the plurality of host applications 116a . . . 116n. In certain alternative embodiments, an I/O request may be sent to the secondary storage controller 108, even when the primary storage controller 106 has not failed. For example, in certain embodiments, when maintenance or other activities are being performed on the primary storage controller 106, data may be served from the secondary storage controller 108 for a period of time before switching back to the primary storage controller 106. The primary storage controller 106 may be considered to be operational when the primary storage controller is available for processing I/O requests generated by one or more of the host applications 116a . . . 116n.

FIG. 2 illustrates an embodiment in which the redirection application 118 receives I/O requests from a plurality of hosts 102a . . . 102n and directs the I/O request for execution to the primary storage controller 106 if the primary storage controller 106 is operational. If the primary storage controller 106 is not operational the redirection application 118 directs the I/O request for execution to the secondary storage controller 108, where the secondary storage controller 108 was in a synchronous PPRC relationship with the primary storage controller 106 at the point of failure of the primary storage controller 106.

Figure 3:
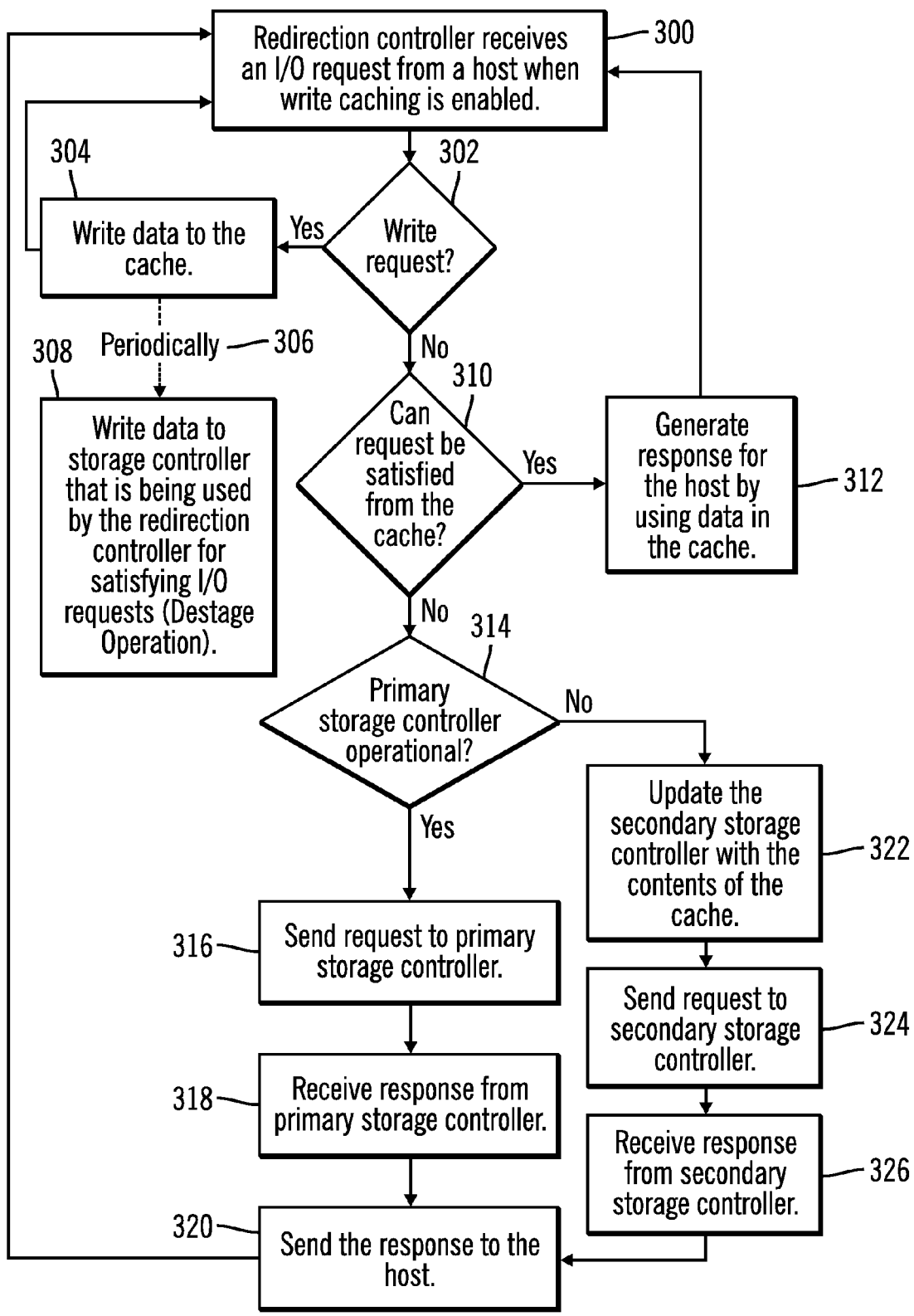
FIG. 3 illustrates operations for redirecting storage accesses when write caching is enabled in the redirection controller, in accordance with certain embodiments.

FIG. 3 illustrates operations for redirecting storage accesses when write caching is enabled in the redirection controller 104, in accordance with certain embodiments. In certain embodiments, the operations may be implemented in the redirection application 118.

In certain embodiments, write caching is enabled in the redirection controller 104. The enablement of write caching may be performed by the redirection application 118 or by another application. When write caching is enabled, the redirection application 118 may write data to the cache 120 in response to write requests and may respond to certain I/O requests from the host applications 116a . . . 116n from data stored in the cache 120. If the redirection application 118 is unable to respond to an I/O request from the data stored in the cache 120, then the redirection application 118 may forward the request to a storage controller. The cache 120 is destaged at periodic intervals to the storage controller that is used by the redirection application 118 to satisfy I/O requests. Destaging the cache 120 to a storage controller may include copying or moving the contents of the cache 120 to volumes controlled by the storage controller. The enablement of write caching may result in faster responses to I/O requests from the hosts 102a . . . 102n because responses may be generated faster when data is available in the cache 120 as opposed to securing the data from the storage controllers 106, 108.

Control starts at block 300 where the redirection application 118 receives an I/O request from one of the plurality of host applications 116a . . . 116n when write caching is determined to be enabled. The redirection application 118 determines (at block 302) whether the I/O request is a write request. If so, the redirection application 118 writes (at block 304) the data corresponding to the write request to the cache 120 and control returns to block 300 where the next I/O request from the hosts 102a . . . 102n is processed. Periodically (reference numeral 306), either the redirection application 118 or some other application performs a destage operation (at block 308) where some or all of the contents of the cache 120 are written to the storage controller to which I/O requests are being forwarded by the redirection application 118 for execution.

If the redirection application 118 determines (at block 302) that the I/O request is not a write request then the redirection application 118 determines (at block 310) whether the request can be satisfied from the cache 120, i.e., data for processing the request is available in the cache 120. If so, the redirection application 118 generates (at block 312) the response to the host application from which the I/O request was received by using the data stored in the cache 120. Therefore, read requests whose data is available in the cache 120 are being satisfied by using the cache 120.

If the redirection application 118 determines (at block 310) that the I/O request cannot be satisfied from the cache 120, then the redirection application 118 determines (at block 314) whether the primary storage controller 106 is operational.

If the redirection application 118 determines (at block 314) that the primary storage controller 106 is operational then the redirection application 118 sends (at block 316) the I/O request to the primary storage controller 106 for execution.

The redirection application 118 receives (at block 318) a response from the primary storage controller 106, where the response is a result of the execution of the request. The redirection application 118 sends (at block 320) the response to the host application from which the redirection application 118 received the I/O request. Since the primary storage controller 106 is in a synchronous PPRC relationship with the secondary storage controller 108 the response is received by the redirection application 118 only after the data in the primary and secondary storage controllers 106, 110 are identical. Control returns to block 300, where the redirection application 118 receives another I/O request from one of the host applications 116a . . . 116n.

If the redirection application 118 determines (at block 314) that the primary storage controller 106 is not operational then the redirection application 118 updates (at block 322) the secondary storage controller 108 with the contents of the cache 120. While the primary and secondary storage controllers 106, 108 are in a synchronous PPRC relationship at the point of failure of the primary storage controller 106, the data in the cache 120 may not have been destaged to the primary storage controller 106. Therefore, before processing I/O requests at the secondary storage controller 108 the contents of the cache 120 should be used to update the storage volumes of the secondary storage controller 108.

The redirection application 118 sends (at block 324) the I/O request to the secondary storage controller 108 for execution. The secondary storage controller 108 processes the I/O request and the redirection application 118 receives (at block 326) a response from the secondary storage controller 108. Since the secondary storage controller 108 has the same data as the primary storage controller 106 at the point of failure of the primary storage controller, and the contents of the cache 120 at the point of failure of the primary storage controller 106, the response from the secondary storage controller 108 is correct. The redirection application 118 sends (at block 320) the received response to the host application from which the redirection application 118 received the I/O request and control returns to block 300 for processing additional I/O requests from the plurality of hosts applications 116a . . . 116n.

FIG. 3 illustrates an embodiment in which the redirection controller 104 includes a cache 120 and write caching is enabled in the redirection controller 104. Not only are the primary and secondary storage controllers 106, 108 kept in a synchronous PPRC relationship, but also in the event of a failure of the primary storage controller 106 the secondary storage controller 108 is updated with the contents of the cache 120, prior to sending I/O requests for execution to the secondary storage controller 108.

In certain embodiments, when a failed primary storage controller 106 becomes operational, the storage controllers 106, 108 may synchronize any updated data from the secondary storage controller 108 back to the primary storage controller 106 and then the replication controller 104 may start using the primary storage controller 106 once again for satisfying I/O requests.

Certain embodiments allow a plurality of hosts 102a . . . 102n to be handled simultaneously by a single replication controller 104, where the single replication controller 104 redirects I/O requests from the plurality of hosts 102a . . . 102n to the storage controllers 106, 108. Therefore, a plurality of versions of the redirection application 118 adapted for different operating systems are not required for the plurality of hosts 102a . . . 102n. Even if the operating systems on the hosts 102a . . . 102n are identical, without the replication controller 104, each host would require an installed application to perform I/O requests directly with the storage controller 106, 108. Therefore, certain embodiments ensure that a single replication application 118 can handle I/O requests from a plurality of hosts 102a . . . 102n. In certain embodiments, a single installation of a program on the redirection application 118 is enough for performing I/O operations with the storage controllers 106, 108.

In certain embodiments, the plurality of hosts 102a . . . 102n operate without receiving any notification that indicates which storage controller 106, 108 satisfies the I/O requests from the plurality of hosts 102a . . . 102n. Therefore, a failure of the primary storage controller 106 is handled by the redirection controller 104 and not by the plurality of hosts 102a . . . 102n.

In certain embodiments, the redirection controller 104 is a specialized appliance, such as, the IBM TotalStorage SAN volume controller. In certain embodiments, such specialized appliances may improve the performance of the computing environment 100 over computing environments where each host directly performs I/O operations with the storage controllers 106, 108.

Certain embodiments provide a replication controller 104 that continues to receive and satisfy all data accesses from a plurality of hosts 102a . . . 102n, even when a primary storage controller 106 has failed. Based on whether write caching is enabled in the replication controller 104, the replication controller 104 may operate differently. The plurality of hosts 102a . . . 102n do not need to know how to recover from a failure of the primary storage controller 106. Thus even in the event of a failure of storage controller, no reconfiguration is required for any of the plurality of hosts 102a . . . 102n.

Additional Embodiment Details

The described techniques may be implemented as a method, apparatus or article of manufacture involving software, firmware, micro-code, hardware and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DYD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a file server via a network. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed.

Figure 4:
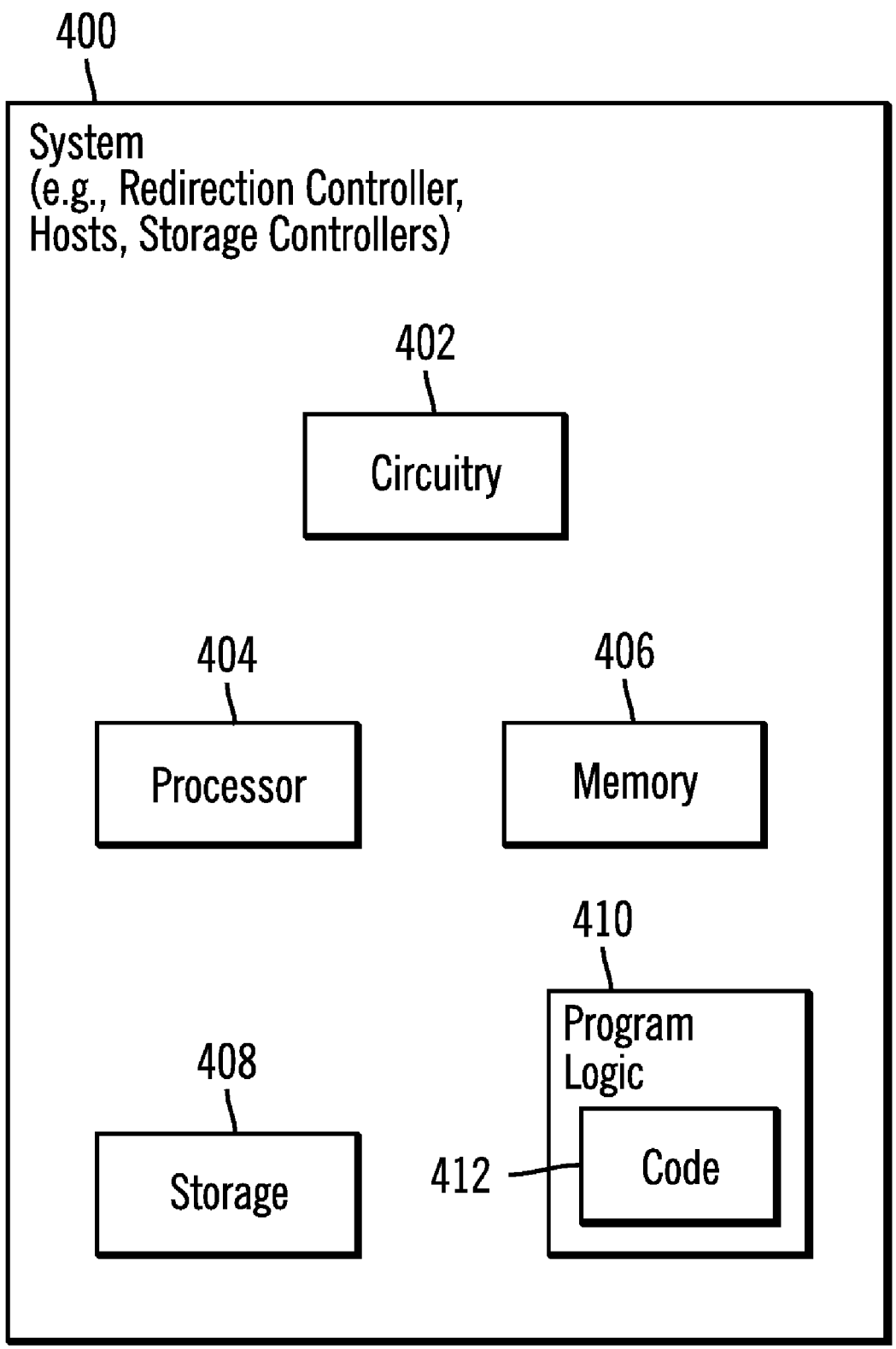
FIG. 4 illustrates an exemplary system in which certain embodiments are implemented.

FIG. 4 illustrates a block diagram of a system 400 in which certain embodiments may be implemented. In certain embodiments, redirection controller 104, the hosts 102a . . . 102n, and the storage controllers 106, 108 may be implemented in accordance with the system 400. The system 400 may include a circuitry 402 that may in certain embodiments include a processor 404. The system 400 may also include a memory 406 (e.g., a volatile memory device, such as, RAM), and storage 408. Certain elements of the system 400 may or may not be found in the redirection controller 104, the hosts 102a . . . 102n, and the storage controllers 106, 108. The storage 408 may include a non-volatile memory device (e.g., EEPROM, ROM, PROM, flash, firmware, programmable logic, etc.), magnetic disk drive, optical disk drive, tape drive, etc. The storage 408 may comprise an internal storage device, an attached storage device and/or a network accessible storage device. The system 400 may include a program logic 410 including code 412 that may be loaded into the memory 406 and executed by the processor 404 or circuitry 402. In certain embodiments, the program logic 410 including code 412 may be stored in the storage 408. In certain other embodiments, the program logic 410 may be implemented in the circuitry 402. Therefore, while FIG. 4 shows the program logic 410 separately from the other elements, the program logic 410 may be implemented in the memory 406 and/or the circuitry 402.

Certain embodiments may be directed to a method for deploying computing instructions by a person or automated processing integrating computer-readable code into a computing system, wherein the code in combination with the computing system is enabled to perform the operations of the described embodiments.

At least certain of the operations of FIGS. 2, 3 may be performed in parallel as well as sequentially. In alternative embodiments, certain of the operations may be performed in a different order, modified or removed.

Furthermore, many of the software, hardware, and firmware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-4 are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A system comprising a controller coupled to a primary storage control unit and a secondary storage control unit, the system comprising:
   memory; and
   processor coupled to the memory, wherein the processor is capable of performing operations, the operations comprising:
   (A) receiving a request at the controller from one of a plurality of hosts, wherein the controller is a storage area network volume controller that controls storage volumes in a primary storage control unit and a secondary storage control unit, wherein the controller includes a cache, and wherein data is replicated synchronously from the primary storage control unit to the secondary storage control unit;
   (B) determining whether write caching is enabled in the controller;
   (C) in response to determining that write caching is not enabled in the controller, sending the request to the primary storage control unit if the primary storage control unit is operational and sending the request to the secondary storage control unit if the primary storage control unit is not operational; and
   (D) in response to determining that write caching is enabled in the controller, wherein if the request is a write request then performing:
      (a) writing the data to the cache in response to receiving the write request; and
      (b) responding to the one of the plurality of hosts from which the write request was received that the write request has been executed, wherein the data written to the cache is destaged periodically to: (i) the primary storage control unit, in response to determining that that primary storage control unit is operational; and (ii) the secondary storage control unit, in response to determining that the primary storage control unit is not operational.

2. The system of claim 1, wherein if write caching is enabled in the controller then updating the secondary storage control unit with contents of the cache, prior to the generating of the response by accessing the secondary storage control unit.

3. The system of claim 1, wherein the plurality of hosts operate without any notification that indicates to the plurality of hosts which storage control unit satisfies requests from the hosts.

4. The system of claim 1, wherein write caching is enabled, wherein if the request is a read request then the operations further comprise:
   (a) satisfying the read request from the cache, in response to determining that the read request can be satisfied from the cache;
   (b) satisfying the read request from the primary storage control unit if the primary storage control unit is operational, in response to determining that the read request cannot be satisfied from the cache;
   (c) updating the secondary storage control unit with contents of the cache if the primary storage control unit is not operational; and
   (d) satisfying the read request from the secondary storage control unit subsequent to the updating of the secondary storage control unit.

5. The system of claim 1, wherein the data is synchronously replicated between the primary storage control unit and the secondary storage control unit by:
   sending, by the primary storage control unit, a completion notification after an update to the primary storage control unit has been copied to the secondary storage control unit, wherein the primary storage control unit and the secondary storage control unit include identical data after the data is replicated synchronously.

6. The system of claim 1, wherein a plurality of operating systems are executing on the plurality of hosts, and wherein a single application enables the plurality of hosts to access data stored in the primary storage control unit and the secondary storage control unit, and wherein if the primary storage control unit is operational then the primary storage control unit is available for processing data transfer requests generated by the plurality of hosts.

7. The system of claim 1, wherein the primary storage control unit is a primary storage controller, wherein the secondary storage control unit is a secondary storage controller, wherein a redirection application on the storage area network volume controller performs the receiving, the determining, the generating of the response by accessing the primary storage controller, and the generating of the response by accessing the secondary storage controller.

8. A computer readable storage medium including code, wherein the code when executed by a machine causes operations to be performed, the operations comprising:
   receiving, at a controller, a request from one of a plurality of hosts, wherein the controller is coupled to a primary storage control unit and a secondary storage control unit, wherein the controller is a storage area network volume controller that controls storage volumes in a primary storage control unit and a secondary storage control unit, wherein the controller includes a cache, and wherein data is replicated synchronously from the primary storage control unit to the secondary storage control unit;
   determining whether write caching is enabled in the controller;
   in response to determining that write caching is not enabled in the controller, sending the request to the primary storage control unit if the primary storage control unit is operational and sending the request to the secondary storage control unit if the primary storage control unit is not operational; and in response to determining that write caching is enabled in the controller, wherein if the request is a write request then performing:
(a) writing the data to the cache in response to receiving the write request; and
(b) responding to the one of the plurality of hosts from which the write request was received that the write request has been executed, wherein the data written to the cache is destaged periodically to: (i) the primary storage control unit, in response to determining that that primary storage control unit is operational; and (ii) the secondary storage control unit, in response to determining that the primary storage control unit is not operational.

9. The computer readable storage medium of claim 8, wherein if write caching is enabled in the controller then updating the secondary storage control unit with contents of the cache, prior to the generating of the response by accessing the secondary storage control unit.

10. The computer readable storage medium of claim 8, wherein the plurality of hosts operate without any notification that indicates to the plurality of hosts which storage control unit satisfies requests from the hosts.

11. The computer readable storage medium of claim 8, wherein write caching is enabled, wherein if the request is a read request then the operations further comprise:
satisfying the read request from the cache, in response to determining that the read request can be satisfied from the cache;
satisfying the read request from the primary storage control unit if the primary storage control unit is operational, in response to determining that the read request cannot be satisfied from the cache;
updating the secondary storage control unit with contents of the cache if the primary storage control unit is not operational; and
satisfying the read request from the secondary storage control unit subsequent to the updating of the secondary storage control unit.

12. The computer readable storage medium of claim 8, wherein the data is synchronously replicated between the primary storage control unit and the secondary storage control unit by:
sending, by the primary storage control unit, a completion notification to the controller after an update to the primary storage control unit has been copied to the secondary storage control unit, wherein the primary storage control unit and the secondary storage control unit include identical data after the data is replicated synchronously.

13. The computer readable storage medium of claim 8, wherein a plurality of operating systems are executing on the plurality of hosts, and wherein a single application in the controller enables the plurality of hosts to access data stored in the primary storage control unit and the secondary storage control unit, and wherein if the primary storage control unit is operational then the primary storage control unit is available for processing data transfer requests generated by the plurality of hosts.

14. The computer readable storage medium of claim 8, wherein the primary storage control unit is a primary storage controller, wherein the secondary storage control unit is a secondary storage controller, wherein a redirection application on the storage area network volume controller performs the receiving, the determining, the generating of the response by accessing the primary storage controller, and the generating of the response by accessing the secondary storage controller.

* * * * *